United States Patent Office.

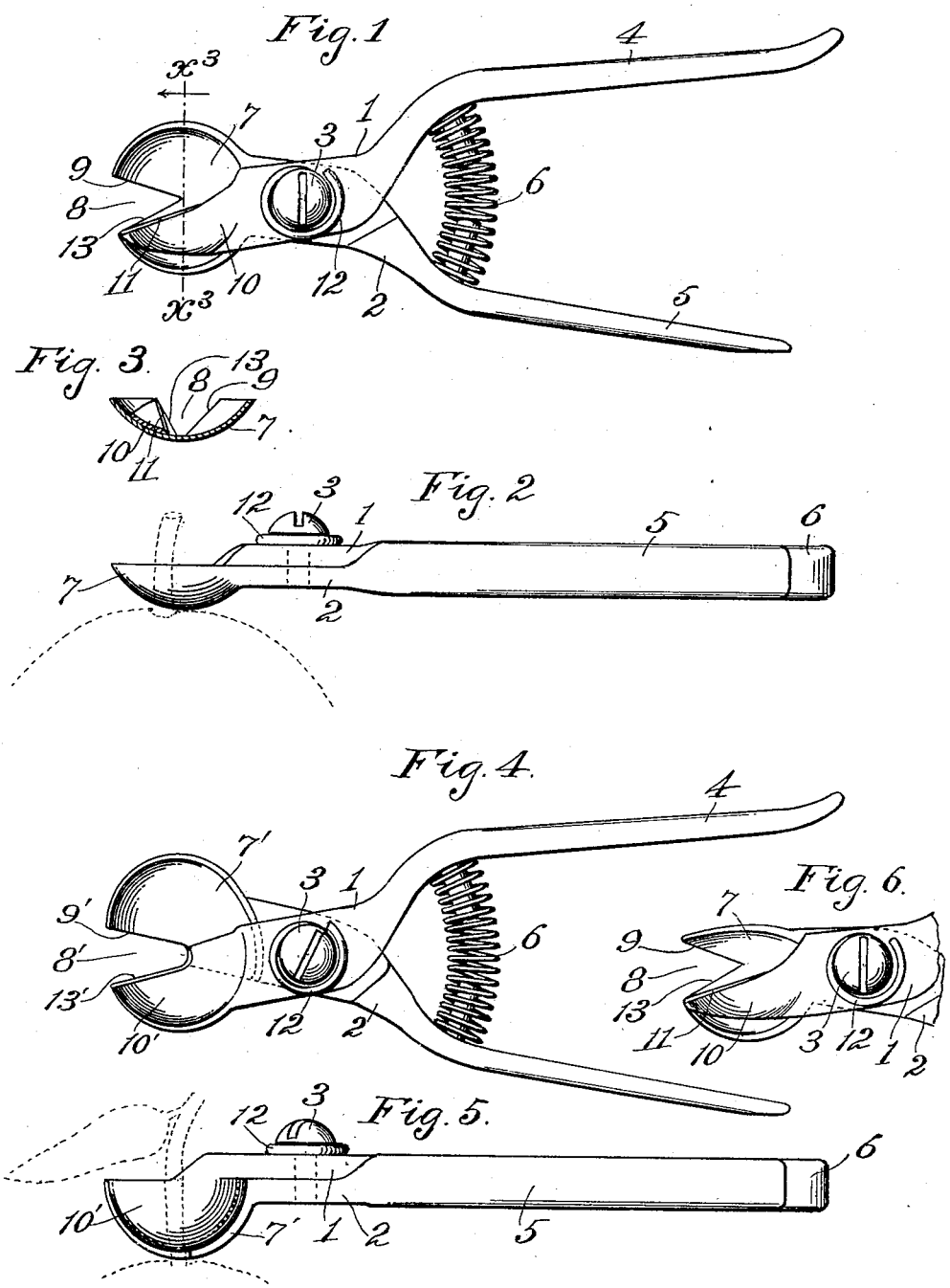

HOWARD H. PETTY, OF POMONA, CALIFORNIA.

FRUIT-CLIPPER.

No. 814,799.  Specification of Letters Patent.  Patented March 13, 1906.

Application filed April 13, 1905. Serial No. 255,319.

*To all whom it may concern:*

Be it known that I, HOWARD H. PETTY, a citizen of the United States, residing at Pomona, in the county of Los Angeles and State of California, have invented a new and useful Improvement in Fruit-Clippers, of which the following is a specification.

The main object of this invention is to provide a fruit-clipper which will not cut or injure the fruit in clipping the same.

A further object of the invention is to provide a fruit-clipper which can be easily brought into position for clipping the fruit and will not interfere with the view of the part being cut by the operator.

Oranges usually have a slight depression or bowl-shaped form around the stem, and an object of this invention is to provide a clipper by means of which the stem can be clipped far enough below the bowl or stem to insure against pricking of one fruit by the stem of another when the oranges are placed in boxes.

It has been discovered that the pricking or breaking of the skin of an orange so as to break open the oil-cells will cause decay, and an object of this invention is to produce a safety fruit-clipper which will avoid any danger of breaking such cells in one orange by the stems of another.

The accompanying drawings illustrate the invention.

Figure 1 is a plan. Fig. 2 is a side elevation. Fig. 3 is a section on the line $x^3 x^3$, Fig. 1. Fig. 4 is a plan of a different form of a clipper. Fig. 5 is a side elevation thereof. Fig. 6 is a plan of a modification in which the bowl is shown of segmental form.

Referring to Figs. 1 to 3, the clipper comprises two members 1 and 2, pivoted together at 3 by screw, bolt, or pin and provided with handle portions 4 5 for closing the clipper-jaws and spring 6 for opening the jaws. The jaws or clippers are rounded to form when in closed position a substantially complete bowl or spherical segment. In the form shown in Figs. 1 to 3 one jaw 7 forms nearly a complete bowl, being cut away or notched at its forward or outer side to form a V-shaped notch or wedge-shaped opening 8, extending between edges 9 and 13, which taper or incline toward one another, extending to the center of the bowl. The other jaw member 10 is spherically curved to fit within the bowl 7 and to swing across the wedge-shaped notch 8 therein, so that when the jaw 10 is clear of the notch the wedge-shaped opening is unobstructed and may be slipped over the stem of the fruit to wedge the stem tightly in the notch, which will hold the stem rigid and prevent the jaw member 7 from moving on the fruit and bruising the same, while the blade 10 is swung across the spring to snip the stem. The edge 9 of the side of said notch which is opposite the edge 11 of the jaw 10 is sharpened, as is also the said edge 11, so that when the jaws are close together the riding of said jaws over one another will cut and clip the fruit. A spring 12 is provided at the pivot 3 to permit of a certain amount of lateral movement as the jaws ride upon one another, said spring being shown in the form of a coil of wire sprung sufficiently to bear on the member 1 and press against the member 2.

In using the clipper the same is grasped in the hand and the jaw 7 placed over the fruit so that the edges 9 9' pass on either side of the stem, which enters the notch 8, and then closing the jaws the jaws 10 will slide within the jaw 7 and over the notch 8 and edge 9', thereby severing the stem. In this operation the rounded shape of the lower faces of the jaws enables a clear view to be obtained of the stem and fruit close to and at the point of cutting, thereby facilitating the operation. The fact that the jaws are so rounded and that the outer jaw 7 is itself of a general circular shape without projecting angles, corners, or points prevents any liability of damage or injury to the fruit by projection or intrusion of the jaws into the fruit. The perimeter of the outer jaw 7 being rounded acts as a guard or buffer to aid in guiding the clipper into place without cutting the fruit.

In the form shown in Figs. 4 and 5 the inner and outer bowl-shaped members are more nearly of the same size, said members (indicated at 7' and 10') in this case each forming approximately one-half of the bowl, the members 10' sliding within the member 7'. The notch 8' in this case is formed between the edges 9' and 13' of the respective jaw members 7' and 10'. The other parts of the device are as above described, and the operation is the same as that above set forth.

It will be understood from Fig. 6 that the principle of this invention will not be departed from by omitting a portion of the bowl-shaped jaw 7, shown in the other views, in which the form at present deemed preferable is illustrated.

What I claim is—

1. A fruit-clipper comprising two pivotally-connected members, one of which has a jaw formed as a portion of a bowl with an inwardly-extending wedge-shaped notch having a cutting edge, and the other member has a jaw fitting and sliding within the aforesaid jaw and having a cutting edge coöperating with the aforesaid cutting edge.

2. A fruit-clipper comprising two pivotally-connected members, one of which has a jaw shaped as a portion of a bowl and notched at its forward side, and the other jaw being curved to fit within said bowl, the opposing edges of the inner jaw and of the notch being provided with cutting edges.

3. A fruit-clipper comprising two pivotally-connected members, one of which has a wedge-shaped opening with a cutting edge, the other member having a cutting edge and being formed to fully expose the wedge-shaped opening of the other member, when opened, so that the wedge-shaped opening can receive the fruit-stems of various sizes and will tightly grip the stem while it is being snipped.

In testimony whereof I have hereunto set my hand, at Los Angeles, California, this 1st day of April, 1905.

HOWARD H. PETTY.

In presence of—
JAMES R. TOWNSEND,
JULIA TOWNSEND.